No. 756,384. Patented April 5, 1904.

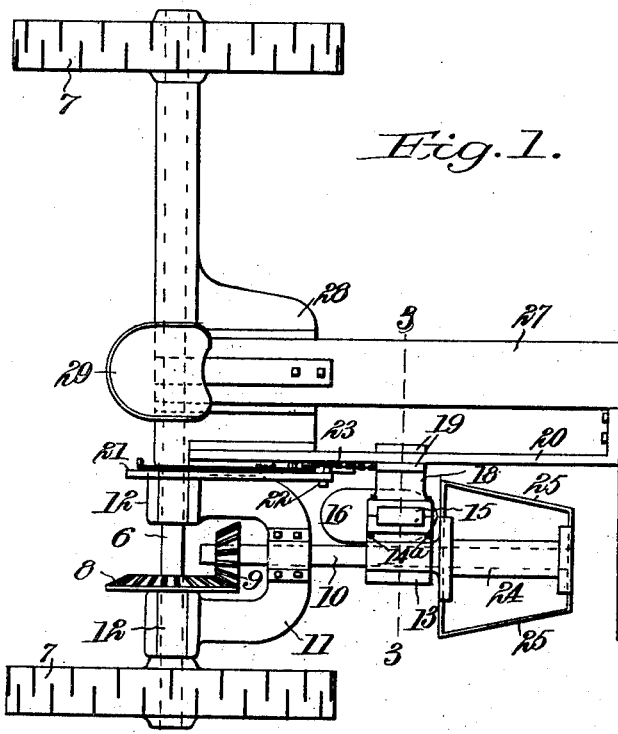

UNITED STATES PATENT OFFICE.

WILLIAM E. LEWIS, OF OWOSSO, MICHIGAN.

ROTARY PLANT-CHOPPER.

SPECIFICATION forming part of Letters Patent No. 756,384, dated April 5, 1904.

Application filed June 18, 1903. Serial No. 162,073. (No model.)

*To all whom it may concern:*

Be it known that I, WILLIAM E. LEWIS, a citizen of the United States, residing at Owosso, in the county of Shiawassee and State of Michigan, have invented new and useful Improvements in Rotary Plant-Choppers, of which the following is a specification.

This invention relates particularly to machines for blocking out beets and similar plants, and has for its object to produce an improved machine in which the plants of a row are cut and thinned out by revolving knives cutting across the row.

Improvement is claimed with respect to the general and simple structure of the device and with respect to the means for supporting and adjusting the revolving knife, as will be more fully explained hereinafter.

In the accompanying drawings, Figure 1 is a top plan view of the machine. Fig. 2 is a fragmentary side elevation. Fig. 3 is a fragmentary section on the line 3 3 of Fig. 1, and Figs. 4 and 5 are detail views of the knife.

Referring specifically to the drawings, 6 indicates an axle supported on wheels 7 and driven thereby through any suitable clutch device, such as a ratchet-hub. The axle carries a bevel-gear 8, meshing with a pinion 9 on the knife-shaft 10, which extends at a right angle to the axle in front thereof. The rear end of the knife-shaft is supported in a suitable bearing-box on a yoke 11, the ends of which have boxes 12, in which the axle turns, so that the yoke is free to swing vertically to accommodate the vertical vibration of the knife-shaft in passing over rough ground or in being raised and lowered by hand, as explained hereinafter. The front end of the knife-shaft finds its bearing in a box 13, the members of which are flanged and shaped at one side to form part of a housing 14 for the stem or post 15 of the shoe 16. The other part of the housing consists of a casting 17, having a laterally-projecting arm 18, which is forked vertically, as at 19, to receive a guide-bar 20.

The parts 14 and 17 of the housing and the stem 15 are held together by bolts 14$^a$, and the stem 15 is vertically adjustable in the housing to vary the distance of the shaft 10 from the ground, and consequently the depth of the cut of the knives carried thereby. The desired adjustment is effected by loosening the bolts. To prevent slipping, the engaging faces of the housing and stem are corrugated, as at 15$^a$.

As will be seen, the shoe supports the front end of the shaft, and consequently the knife, at the desired distance from the ground, and inasmuch as the shaft and its bearings are free to swing in a vertical plane the knives are accommodated to any inequalities of the ground. Lateral vibration is prevented and the vertical swing guided by the forks 19, working beside the guide-bar 20. This also prevents any tilt or turn of the shoe and the bearing carried thereby.

The knife and its shaft may be raised to stop its work by means of the hand-lever 21, which is fulcrumed at 22 on the bar 20 and is connected by chain 23 to the arm 18. The lever has the usual spring-latch and segment. The pinion 9 may have any suitable clutch device for throwing it in and out of gear with the wheels 8. I have considered it unnecessary to illustrate this device, since its provision would be a mere matter of mechanical skill.

The knife comprises a hub 24, fixed to the front end of the shaft 10. This hub carries the knives 25, which are inclined with respect to their length to approximate the frustum of a cone and inclined laterally to cut across and along the row, thus giving a draw cut which is very effective for the purpose intended.

The machine is adapted to be drawn by one horse in thills 26, attached to the front end of a short tongue 27, bolted to a suitable casting 28 upon the axle. The tongue also forms a convenient support for the seat 29.

The operation is evident from the description; but it may be added that the supporting-shoe for the knife-shaft runs close behind the knife, so that it follows the inequalities of the ground and varies the height of the knife accordingly, so that the same depth of cut is given.

What I claim as new, and desire to secure by Letters Patent, is—

1. The combination with a driving-axle, of a support hinged thereto, a shaft, driven by the axle, the inner end of which is held in bearings on the support, a knife on the outer end of the shaft, and a support traveling on the ground for the outer end of the shaft.

2. The combination with a frame, a driving-axle thereon, and a shaft geared at an angle to the axle, of a support for the inner end of the shaft, hinged to the axle, cutters on the outer end of the shaft, a vertically-movable support for the shaft on the ground adjacent the cutters, said shaft being adjustable with respect to the support, and a guide on the frame for the vertical movement of said support.

In testimony whereof I have signed my name to this specification in the presence of two subscribing witnesses.

WILLIAM E. LEWIS.

Witnesses:
L. G. BREWER,
J. O. CHASE.